(12) United States Patent
Yamada et al.

(10) Patent No.: US 9,197,126 B2
(45) Date of Patent: Nov. 24, 2015

(54) POWER CONVERTING APPARATUS

(75) Inventors: Masaki Yamada, Tokyo (JP); Takahiro Urakabe, Tokyo (JP); Akihiko Iwata, Tokyo (JP); Norikazu Ito, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 134 days.

(21) Appl. No.: 13/258,055

(22) PCT Filed: Apr. 1, 2009

(86) PCT No.: PCT/JP2009/001521
§ 371 (c)(1),
(2), (4) Date: Sep. 21, 2011

(87) PCT Pub. No.: WO2010/113218
PCT Pub. Date: Oct. 7, 2010

(65) Prior Publication Data
US 2012/0014139 A1 Jan. 19, 2012

(51) Int. Cl.
*H02M 3/335* (2006.01)
*H02M 1/42* (2007.01)

(52) U.S. Cl.
CPC .......... *H02M 1/4225* (2013.01); *H02M 1/4208* (2013.01); *Y02B 70/126* (2013.01)

(58) Field of Classification Search
CPC ... H02M 1/4208; H02M 1/4225; H02M 1/42; H02M 1/4216; H02M 1/4233; H02M 1/4241; H02M 1/425; H02M 1/4266; H02M 5/453; H02M 5/458; H02M 5/4585; H02M 2001/0067; H02M 2001/007; H02M 2001/0074; H02M 2001/0077; H02M 7/02; H02M 7/21; H02M 7/217; H02M 7/219; H02M 7/2195; H02M 7/25; H02M 7/42; H02M 7/48; H02M 7/4807; H02M 7/4826; H02M 7/537; H02M 7/5387; H02M 7/53871; H02M 7/5388; Y02B 70/126; Y02B 70/12612; Y02B 70/123; Y02B 70/1491
USPC ................ 363/19, 21.03, 21.1, 25–28, 56.01, 363/56.03, 56.04, 123, 125–127, 15–17, 34, 363/125–127, 21.02, 35, 37–48, 55–56.02, 363/65–72, 74, 95–98, 131–134; 323/282–286, 204–211, 222–226, 235, 323/266, 271–275, 280, 351
See application file for complete search history.

(56) References Cited

U.S. PATENT DOCUMENTS 6,137,700 A * 10/2000 Iida et al. .......................... 363/89
6,914,794 B2 * 7/2005 Watanabe et al. ............. 363/132
(Continued)

FOREIGN PATENT DOCUMENTS

JP  2 299470    12/1990
JP  3 3664      1/1991
(Continued)

OTHER PUBLICATIONS

English Translation JP2000116126.*
(Continued)

*Primary Examiner* — Timothy J Dole
*Assistant Examiner* — Carlos Rivera-Perez
(74) *Attorney, Agent, or Firm* — Oblon, McClelland, Maier & Neustadt, L.L.P.

(57) ABSTRACT

In a power converting apparatus which converts AC power into DC power, an inverter circuit including at least one series-connected single-phase inverter is connected in a downstream of a stage in which an AC input is rectified in series therewith. In the downstream stage of the inverter circuit, there are provided a smoothing capacitor connected via a rectifier diode and a short-circuiting switch for bypassing the smoothing capacitor. The short-circuiting switch is set to an ON state only in each of short-circuiting phase ranges of which midpoint matches each of zero-crossing phases and an output of the inverter circuit is controlled by using a current command so that a DC voltage of the smoothing capacitor follows a target voltage and an input power factor is improved.

17 Claims, 8 Drawing Sheets

(56) References Cited

U.S. PATENT DOCUMENTS

| | | | |
|---|---|---|---|
| 8,294,432 B2 * | 10/2012 | Awane et al. | 323/207 |
| 2002/0180379 A1 | 12/2002 | Shen | |
| 2004/0223281 A1 * | 11/2004 | Suzui et al. | 361/118 |
| 2006/0114696 A1 * | 6/2006 | Igarashi et al. | 363/13 |
| 2009/0116268 A1 | 5/2009 | Kishida et al. | |
| 2011/0215651 A1 | 9/2011 | Yamada et al. | |

FOREIGN PATENT DOCUMENTS

| | | |
|---|---|---|
| JP | 2000 116126 | 4/2000 |
| JP | 2002 272113 | 9/2002 |
| JP | 2004 527896 | 9/2004 |
| JP | 2005 223867 | 8/2005 |
| JP | 2006 304586 | 11/2006 |
| JP | 2007 58676 | 3/2007 |
| JP | 2007 174723 | 7/2007 |
| JP | 2007 252048 | 9/2007 |
| JP | 2007 282442 | 10/2007 |
| JP | 2007 129456 | 11/2007 |
| JP | 2008 289217 | 11/2008 |

OTHER PUBLICATIONS

English Translation JP2007282442.*
International Search Report issued Jun. 30, 2009 in PCT/JP09/001521 filed Apr. 1, 2009.
Office Action issued Aug. 2, 2011 in Japanese Patent Application No. 2007-264190 filed Oct. 10, 2007.
German Office Action dated Jul. 6, 2015 in corresponding German Patent Application No. 11 2009 004 627.4 with partial English Translation. (14 pages).
J. Salmon and D. Koval, "Improving the Operation of 3-Phase Diode Rectifiers Using an Asymmetrical Half-Bridge DC-Link Active Filter," Industry Applications Conference, 2000. Conference Record of the 2000 IEEE, vol. 4, pp. 2115-2122. (8 pages).

* cited by examiner

POWER CONVERTING APPARATUS

TECHNICAL FIELD

The present invention relates to a power converting apparatus which converts AC power into DC power, the power converting apparatus being provided with a circuit for improving an input power factor.

BACKGROUND ART

A conventional power converting apparatus is configured to full-wave rectify input AC power by a diode bridge with a reactor connected to one end of the diode bridge and a switching device connected between a downstream end of the reactor and the other output end of the diode bridge. Connected downstream of this configuration via a diode is an output stage to perform input current control for improving an input power factor and voltage control of the output stage by turning on and off the aforementioned switching device (refer to Patent Document 1, for example).

Patent Document 1: Japanese Laid-open Patent Application No. 2000-116126

DISCLOSURE OF THE INVENTION

Problems to be Solved by the Invention

A great deal of loss and noise occur in the aforementioned kind of power converting apparatus because an AC voltage is switched at high frequency by a semiconductor switch for controlling a current fed from an AC power supply. Also, if the switching frequency is lowered to avoid this problem, there would arise the need for a large current-limiting reactor in order to achieve a satisfactory input power factor.

The present invention has been made to solve the aforementioned problems. Accordingly, it is an object of the invention to lower power loss and noise and achieve a reduction in system structure by making it unnecessary to employ a large current-limiting circuit in a power converting apparatus which converts AC power into DC power by performing input current control for improving an input power factor and voltage control of an output stage.

Means for Solving the Problem

A power converting apparatus according to this invention includes a rectification circuit for rectifying an input from an AC input power supply, an inverter circuit in which AC sides of at least one single-phase inverter are connected in series and connected to an output of the rectification circuit in series, each single-phase inverter having a plurality of semiconductor switching devices and a DC voltage source, the inverter circuit being configured to superimpose the sum of an output of each single-phase inverter on the output of the rectification circuit, a smoothing capacitor connected to a downstream end of the inverter circuit via a rectifier diode for smoothing an output of the inverter circuit, and a short-circuiting switch of which one end is connected to the inverter circuit and the other end is connected to one end of the smoothing capacitor. The output of the inverter circuit is controlled by using a current command so that a voltage of the smoothing capacitor follows a target voltage and an input power factor of the AC input power supply is improved.

Another power converting apparatus according to this invention includes an inverter circuit in which AC sides of at least one single-phase inverter are connected in series and connected to a first terminal of an AC input power supply in series, each single-phase inverter having a plurality of semiconductor switching devices and a DC voltage source, the inverter circuit being configured to superimpose the sum of an output of each single-phase inverter on an AC input, a smoothing capacitor disposed in a downstream stage of the inverter circuit for smoothing an output of the inverter circuit, and first and second series circuits each of which is configured with a short-circuiting switch and a rectifier diode which are connected in series between both terminals of the smoothing capacitor. A halfway point of the first series circuit is connected to an AC output line of the inverter circuit at a downstream end thereof whereas a halfway point of the second series circuit is connected to a second terminal of the AC input power supply. The output of the inverter circuit is controlled by using a current command so that a voltage of the smoothing capacitor follows a target voltage and an input power factor of the AC input power supply is improved.

Advantageous Effects of the Invention

According to the present invention, it is not necessary for a short-circuiting switch to perform high-frequency switching and an inverter circuit configured to improve an input power factor and control a voltage in an output stage can decrease a voltage handled in switching operation to a relatively low voltage. For this reason, it is possible to reduce switching loss and noise without the need for a large current-limiting circuit, and this makes it possible to provide a power converting apparatus which permits a reduction in power loss and noise as well as a reduction in system structure.

BEST MODES FOR CARRYING OUT THE INVENTION

First Embodiment

Figure 1:
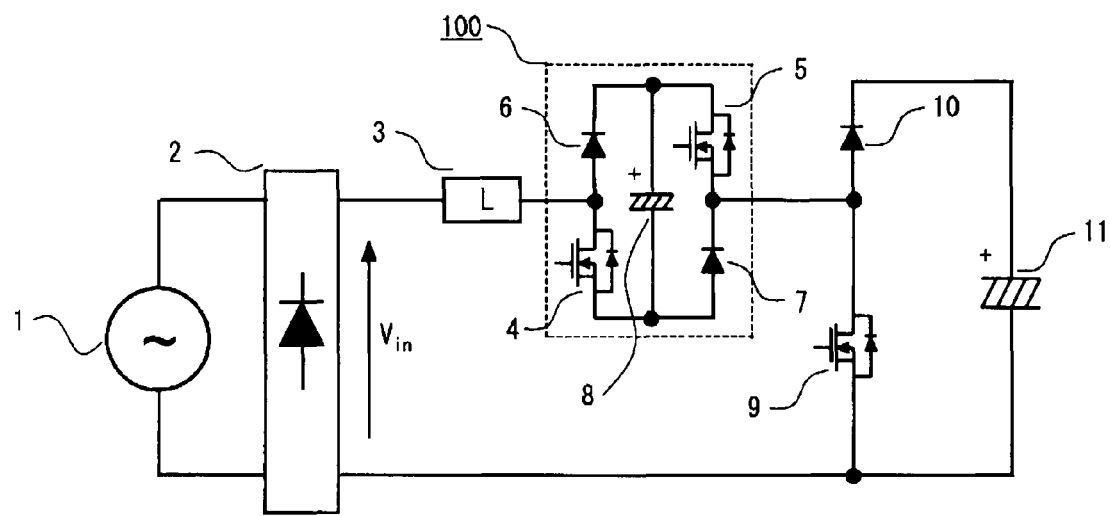
FIG. 1 is a configuration diagram of a power converting apparatus according to a first embodiment of this invention.

A power converting apparatus according to a first embodiment of this invention is now described below. FIG. 1 is a general configuration diagram of the power converting apparatus according to the first embodiment of the invention.

As depicted in FIG. 1, an AC voltage source 1 (hereinafter referred to simply as the AC power supply 1) which serves as an AC input power supply is connected to a diode bridge 2 which serves as a rectification circuit. An output of the diode bridge 2 is connected to a reactor 3 which serves as a current-limiting circuit and an AC side of an inverter circuit 100 configured with a single-phase inverter is series-connected to a downstream end of the reactor 3. The single-phase inverter constituting the inverter circuit 100 includes semiconductor switching devices 4, 5, diodes 6, 7 and a DC voltage source 8. An insulated-gate bipolar transistor (IGBT) in which diodes are connected in reverse parallel or a metal oxide semiconductor field effect transistor (MOSFET) incorporating a diode connected between a source and a drain is used as each of the semiconductor switching devices 4, 5. The diodes 6, 7 may also be configured with semiconductor switching devices like the semiconductor switching devices 4, 5. Also, the reactor 3 may be series-connected to the inverter circuit 100 at a downstream stage thereof.

In the downstream stage of the inverter circuit 100, there are connected a short-circuiting switch 9 and a rectifier diode 10 of which cathode is connected to a positive electrode of a smoothing capacitor 11 provided in an output stage. Here, a connecting point between the short-circuiting switch 9 and an anode of the rectifier diode 10 is connected to an AC output line at the downstream stage of the inverter circuit 100 and the other end of the short-circuiting switch 9 is connected to a negative electrode of the smoothing capacitor 11. While the short-circuiting switch 9 is illustrated as being configured with a semiconductor switching device in which diodes are connected in reverse parallel, the invention is not limited to this configuration but the short-circuiting switch 9 may be a mechanically acting switch, for instance.

The working of the power converting apparatus thus configured is now described with reference to waveforms at individual parts depicted in FIG. 2.

Figure 2:
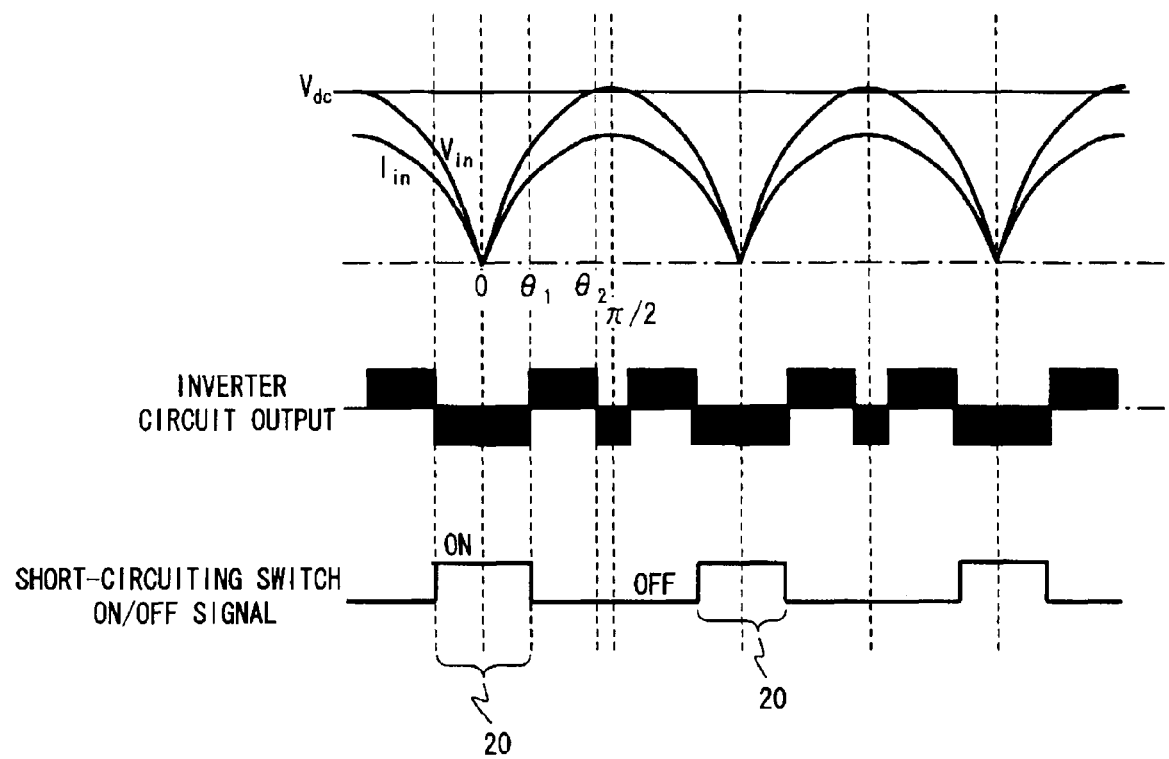
FIG. 2 is a diagram depicting waveforms at individual parts for explaining the working of the power converting apparatus according to the first embodiment of this invention.

An input from the AC power supply 1 is full-wave rectified by the diode bridge 2 and a voltage Vin and a current Iin observed at a downstream end of the diode bridge 2 have waveforms as depicted in FIG. 2. Indicated by vdc is a DC voltage of the smoothing capacitor 11 that is controlled to match a specific target voltage Vdc*. In this case, a peak voltage of the voltage Vin is made higher than the DC voltage Vdc of the smoothing capacitor 11.

Figure 3:
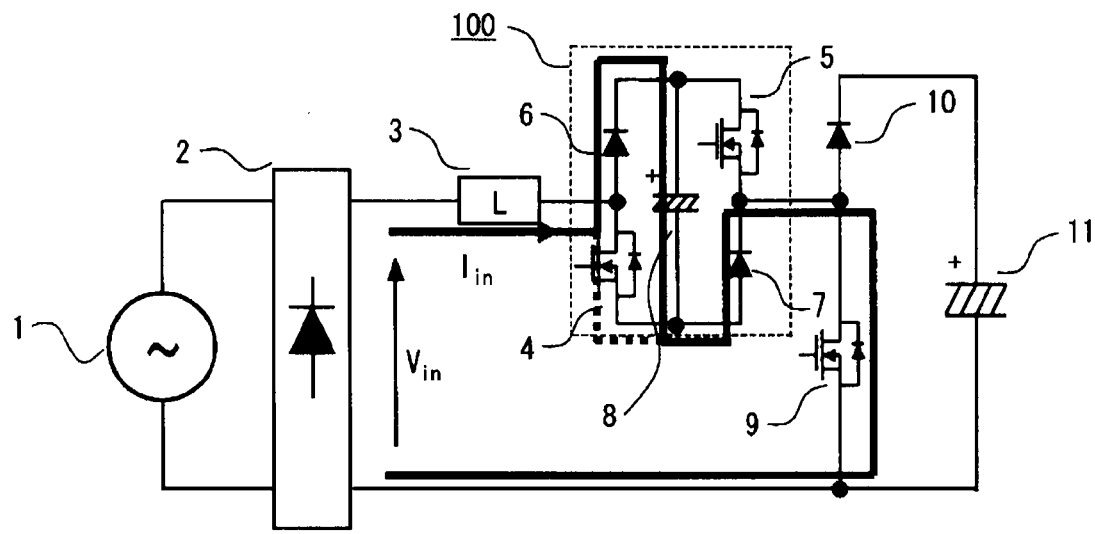
FIG. 3 is a diagram for explaining the working of the power converting apparatus according to the first embodiment of this invention.
Figure 4:
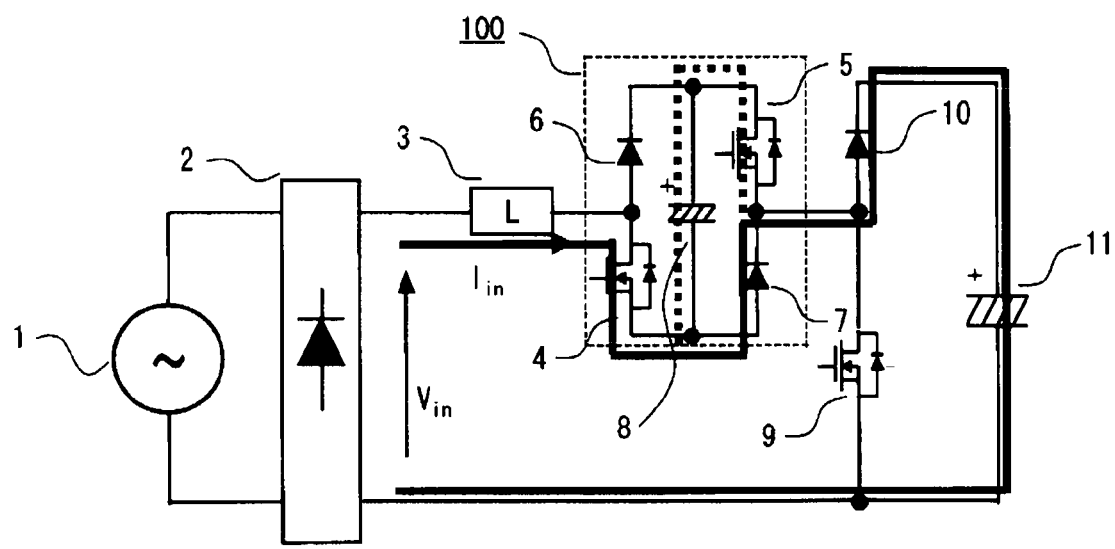
FIG. 4 is a diagram for explaining the working of the power converting apparatus according to the first embodiment of this invention.
Figure 5:
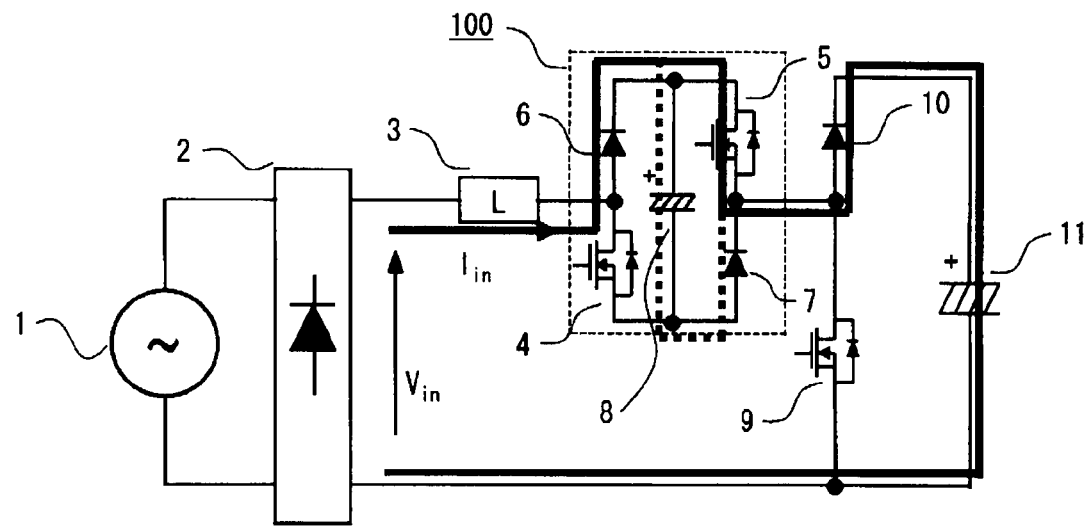
FIG. 5 is a diagram for explaining the working of the power converting apparatus according to the first embodiment of this invention.

The inverter circuit 100 produces an output by controlling the current Iin by pulse width modulation (PWM) control so that an input power factor of the AC power supply 1 becomes approximately 1, and superimposes a voltage generated on the AC side on the voltage Vin at the downstream end of the diode bridge 2. When the semiconductor switching devices 4, 5 are off, a current flowing in the inverter circuit 100 charges the DC voltage source 8 through the diode 6 and is output through the diode 7 as depicted in FIGS. 3 to 5. When only the semiconductor switching device 4 is turned on, the current is output by way of the semiconductor switching device 4 and the diode 7. Similarly, when only the semiconductor switching device 5 is turned on, the current is output by way of the diode 6 and the semiconductor switching device 5. Also, when the semiconductor switching devices 4, 5 are turned on at the same time, the DC voltage source 8 is discharged through the semiconductor switching device 4 and the current is output through the semiconductor switching device 5. The inverter circuit 100 is controlled by PWM control by controlling the semiconductor switching devices 4, 5 by combinations of the above-described four kinds of control operation.

Expressing the phase of an input voltage from the AC power supply 1 by θ and the phase when the voltage Vin becomes equal to the target voltage Vdc* of the smoothing capacitor 11 by θ=θ2 (0<θ2<π/2), the short-circuiting switch 9 is kept in an ON state from a point of phase θ=0 to a point of a specific phase θ1 where 0<θ1<θ2. In this case, a current from the AC power supply 1 flows through a path routed along the AC power supply 1, the diode bridge 2, the reactor 3, the inverter circuit 100, the short-circuiting switch 9, the diode bridge 2 and the AC power supply 1 in this order as depicted in FIG. 3. Since the short-circuiting switch 9 is in the ON state, no current flows through the rectifier diode 10 and the smoothing capacitor 11 in the output stage. The inverter circuit 100 produces the output by controlling the current Iin by PWM control so that the input power factor becomes approximately 1 while generating a voltage that is approximately equal to a reversal of the voltage Vin using a combination of the case in which both of the semiconductor switching devices 4, 5 are off and the case in which only the semiconductor switching device 4 is on, for example. Energy is charged into the DC voltage source 8 of the inverter circuit 100 during this period.

Next, if the short-circuiting switch 9 is turned off when the phase θ=θ1, the current from the AC power supply 1 flows through a path routed along the AC power supply 1, the diode bridge 2, the reactor 3, the inverter circuit 100, the rectifier diode 10, the smoothing capacitor 11, the diode bridge 2 and the AC power supply 1 in this order as depicted in FIG. 4.

When the phase θ satisfies θ1≤θ≤θ2, the inverter circuit 100 produces the output by PWM control using a combination of the case in which the semiconductor switching devices 4, 5 are on at the same time and the case in which only the semiconductor switching device 4 is on, for example. At this time, the inverter circuit 100 produces the output by controlling the current Iin so that the input power factor becomes approximately 1 while generating a voltage that is approximately equal to Vdc*−Vin in order that the DC voltage Vdc of the smoothing capacitor 11 can be maintained at the target voltage Vdc*. Since the polarity of the voltage generated by the inverter circuit 100 and the polarity of the current Iin are the same during this period, the DC voltage source 8 of the inverter circuit 100 is discharged.

Next, if the voltage Vin becomes equal to the DC voltage Vdc* of the smoothing capacitor 11 when the phase θ=θ2, the inverter circuit 100 operates in a different way although the short-circuiting switch 9 remains in an OFF state.

Specifically, when the phase θ satisfies θ2≤θ≤π/2, the current from the AC power supply 1 flows through a path routed along the AC power supply 1, the diode bridge 2, the reactor 3, the inverter circuit 100, the rectifier diode 10, the smoothing capacitor 11, the diode bridge 2 and the AC power supply 1 in this order as depicted in FIG. 5. Also, the inverter circuit 100 produces the output by PWM control using a combination of the case in which both of the semiconductor switching devices 4, 5 are off and the case in which only the semiconductor switching device 5 is on, for example. At this time, the target voltage Vdc* of the smoothing capacitor 11 and the voltage Vin have a relationship expressed by Vdc*≤Vin and the inverter circuit 100 produces the output by controlling the current Iin so that the input power factor becomes approximately 1 while generating a voltage that is approximately equal to Vin−Vdc*, the voltage having polarity opposite to that of the voltage Vin, in order that the DC voltage Vdc of the smoothing capacitor 11 can be maintained at the target voltage Vdc*. Since the polarity of the voltage generated by the inverter circuit 100 and the polarity of the current Iin are opposite to each other during this period, the DC voltage source 8 of the inverter circuit 100 is charged.

As depicted in the FIG. 2, the power converting apparatus operates in symmetrical patterns during a phase period of $\pi/2 \le \theta \le \pi$ and during a phase period of $0 \le \theta \le \pi/2$ while the power converting apparatus operates in the same pattern during a phase period of $\pi \le \theta \le 2\pi$ and during a phase period of $0 \le \theta \le \pi$.

The power converting apparatus switches the short-circuiting switch 9 at specified phases which are defined as zero-crossing phases ($\theta=0, \pi$) of the phase $\theta$ of the input voltage from the AC power supply 1 ±θ1. Specifically, the power converting apparatus sets the short-circuiting switch 9 to the ON state to bypass the smoothing capacitor 11 only in each of phase ranges of ±θ1 (hereinafter referred to as short-circuiting phase ranges 20) of which midpoint matches each of the zero-crossing phases. At this time, the inverter circuit 100 produces the output by controlling the current Iin so that the input power factor becomes approximately 1 while generating a voltage that is approximately equal to a reversal of the voltage Vin, thereby charging the DC voltage source 8. At phases not falling within the aforementioned short-circuiting phase ranges 20, the inverter circuit 100 maintains the DC voltage Vdc of the smoothing capacitor 11 at the target voltage Vdc* and produces the output by controlling the current Iin so that the input power factor becomes approximately 1. In this case, the DC voltage source 8 is discharged if the voltage yin is equal to or lower than the target voltage Vdc* of the smoothing capacitor 11 whereas the DC voltage source 8 is charged if the voltage Vin is equal to or higher than the target voltage Vdc*.

If θ1 is made larger, energy charged into the DC voltage source 8 increases, making it possible to superimpose the generated voltage on the voltage Vin in a high voltage range and increase the amount of discharged energy in a subsequent discharging process. For this reason, it is possible to increase the DC voltage Vdc (target voltage Vdc*) of the smoothing capacitor 11.

In the phase period of $0 \le \theta \le \pi/2$, as aforementioned, the DC voltage source 8 of the inverter circuit 100 is charged during periods $0 \le \theta \le \theta 1$ and $\theta 2 \le \theta \le \pi/2$ and discharged during a period $\theta 1 \le \theta \le \theta 2$. If the amount of energy charged into the DC voltage source 8 of the inverter circuit 100 and the amount of energy discharged therefrom are equal to each other, the following equation is satisfied, where Vp is the peak voltage of the voltage Vin and Ip is a peak current of the current Iin:

$$\int_0^{\theta_1} V_p \sin\theta \cdot I_p \sin\theta \cdot d\theta + \int_{\theta_2}^{\pi/2}(V_p \sin\theta - V_{dc}^*) \cdot I_p \sin\theta \cdot d\theta = \int_{\theta_1}^{\theta_2}(V_{dc}^* - V_p \sin\theta) \cdot I_p \sin\theta \cdot d\theta \quad (1)$$

If Vin=Vp·sin θ and Iin=Ip·sin θ, Vdc*=Vp·π/(4 cos θ1). This indicates that the target voltage Vdc* of the smoothing capacitor 11 is determined by θ1 which defines the short-circuiting phase range 20 and, thus, the target voltage Vdc* can be controlled by varying θ1. Then, the DC voltage Vdc of the smoothing capacitor 11 is controlled to follow the target voltage Vdc*.

Expressing the voltage of the DC voltage source 8 of the inverter circuit 100 by Vsub, the inverter circuit 100 can reliably perform the above-described preferable control operation if the voltage Vsub is set to become equal to or higher than a voltage desirably generated by the inverter circuit 100 in each of the phase periods $0 \le \theta \le \theta 1$, $\theta 1 \le \theta \le \theta 2$ and $\theta 2 \le \theta \le \pi/2$. Specifically, if the voltage Vsub is set to satisfy three conditions expressed by Vp·sin θ1≤Vsub, (Vdc*−Vp·sin θ1)≤Vsub and (Vp−Vdc*)≤Vsub, it is possible to maintain the DC voltage Vdc of the smoothing capacitor 11 at the target voltage Vdc* and causes the inverter circuit 100 to reliably perform the control operation for controlling the current Iin in such a manner that the input power factor becomes approximately 1 at all phases of the AC power supply 1. Incidentally, the voltage Vsub of the DC voltage source 8 is set to become equal to or lower than the peak voltage Vp of Vin.

Described next in the following are details of the control operation performed by the inverter circuit 100 for maintaining the voltage Vdc of the smoothing capacitor 11 at the target voltage Vdc* and controlling the current Iin so that the input power factor becomes approximately 1.

Figure 6:
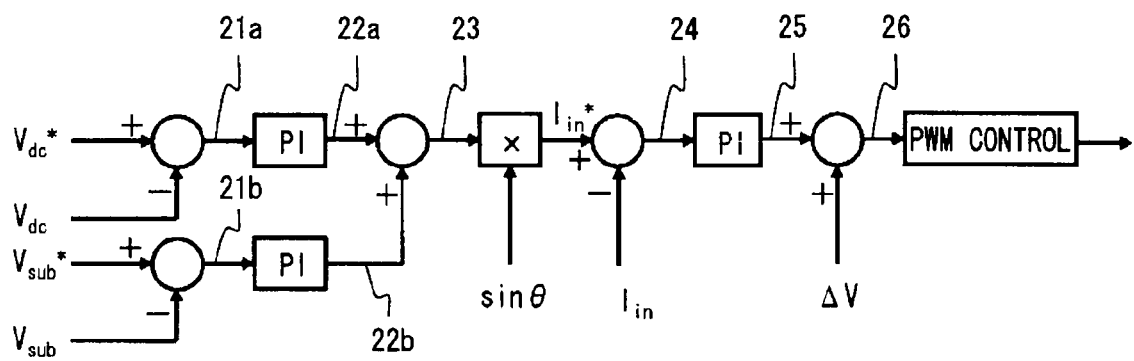
FIG. 6 is a control block diagram depicting control operation performed by an inverter circuit according to the first embodiment of this invention.

The inverter circuit 100 is controlled by control blocks as depicted in FIG. 6. First, using a difference 21a between the DC voltage Vdc of the smoothing capacitor 11 in the output stage and the target voltage Vdc* as a feedback quantity, an output 22a is calculated by proportional-integral (PI) feedback control. Also, to maintain the voltage Vsub of the DC voltage source 8 of the inverter circuit 100 at a constant level, an output 22b is calculated by PI feedback control using a difference 21b between the voltage Vsub and a target voltage Vsub* thereof as a feedback quantity, and an amplitude target value 23 of the current Iin is determined from the sum of the two outputs 22a, 22b. Then, on the basis of this amplitude target value 23, a sine-wave current command Iin* synchronized with the voltage Vin is generated. Next, using a difference 24 between the current command Iin* and the detected current Iin as a feedback quantity, an output is obtained by PI feedback control as a voltage command 25 which serves as a target value of the voltage generated by the inverter circuit 100. At this time, the voltage command 25 is corrected by adding thereto a feedforward correction voltage ΔV which is synchronized with timings of turning on and off the short-circuiting switch 9. Then, using a corrected voltage command 26 (the uncorrected voltage command 25 at other than the timings of turning on and off the short-circuiting switch 9), driving signals to be fed into the individual semiconductor switching devices 4, 5 of the inverter circuit 100 are generated in order to operate the inverter circuit 100.

The short-circuiting switch 9 is switched between the ON and OFF states at the specified phases which are defined as the zero-crossing phases ($\theta=0, \pi$) of the input voltage from the AC power supply 1 ±θ1. The inverter circuit 100 switches from control mode in which the DC voltage source 8 is charged to control mode in which the DC voltage source 8 is discharged when the short-circuiting switch 9 is switched from the ON state to the OFF state, whereas the inverter circuit 100 switches from the control mode in which the DC voltage source 8 is discharged to the control mode in which the DC voltage source 8 is charged when the short-circuiting switch 9 is switched from the OFF state to the ON state. As the voltage command 25 is corrected by adding thereto the feedforward correction voltage ΔV which is synchronized with the timings of turning on and off the short-circuiting switch 9 as described above, it is possible to avoid a delay in control operation by as much as a feedback control response time. Incidentally, the feedforward correction voltage ΔV is a voltage having positive polarity when the short-circuiting switch 9 is switched from the ON state to the OFF state and is a voltage having negative polarity when the short-circuiting switch 9 is switched from the OFF state to the ON state.

In this embodiment, the power converting apparatus is controlled so that the DC voltage Vdc of the smoothing capacitor 11 follows the target voltage Vdc* and the input power factor of the AC power supply 1 is improved by controlling the inverter circuit 100 by using the current command mentioned above. It is not necessary for the short-circuiting switch 9 to perform high-frequency switching and the inverter circuit 100 configured to improve the input power factor and control the DC voltage Vdc in the output stage can decrease a voltage handled in switching operation to a level significantly lower than a peak voltage of the AC power supply 1. For this reason, it is possible to reduce switching loss and noise without the need for a reactor 3 having a large capacity. Also, when the short-circuiting switch 9 is in the ON state, the DC voltage source 8 of the inverter circuit 100 can be charged while bypassing the smoothing capacitor 11 and, therefore, it is possible to flow the current Iin through the AC power supply 1 without causing the inverter circuit 100 to generate a high voltage and charged energy can be used for discharging into the smoothing capacitor 11. For this reason, it is possible to further decrease the voltage handled in the switching operation and achieve a higher efficiency and a further reduction in noise.

It is to be noted that the reactor 3 is not an element for storing energy but serves as a current-limiting circuit for limiting a current to thereby improve the reliability of current control.

Also, advantageous effects of the higher efficiency and the reduction in noise mentioned above are obtained in a reliable fashion with the voltage Vsub of the DC voltage source 8 that is a DC voltage of the inverter circuit 100 set at a level equal to or lower than the peak voltage Vp of Vin.

Also, as the short-circuiting switch 9 is operated only at the specified phases of the input voltage from the AC power supply 1, it is possible to control the power converting apparatus in a stable fashion while producing almost no loss caused by the switching operation. Also, since the smoothing capacitor 11 is bypassed by keeping the short-circuiting switch 9 in the ON state only in each of the short-circuiting phase ranges 20 of ±θ1 of which midpoint matches each of the zero-crossing phases θ=0, π, it is not necessary to deliver any output to the smoothing capacitor 11 in regions where the voltage Vin is low and the power converting apparatus can be configured with the DC voltage of the inverter circuit 100 set low. This makes it possible to obtain advantageous effects including the higher efficiency and the reduction in noise in a reliable fashion.

Additionally, because the target voltage Vdc* of the smoothing capacitor 11 is controlled by θ1 in each of the short-circuiting phase ranges 20, it is possible to easily control the target voltage Vdc*, thereby providing improved degrees of freedom in design and control.

Also, as the inverter circuit 100 is controlled to switch between operations for charging and discharging the DC voltage source 8 by using feedforward control at the timings of turning on and off the short-circuiting switch 9, it is possible to avoid a delay in control operation by as much as the feedback control response time and thereby achieve high-speed control.

Additionally, since the power converting apparatus is controlled to maintain the voltage Vsub of the DC voltage source 8 at a constant level by varying the current command, it is possible to control the power converting apparatus in a stable fashion. It is also possible to balance the amounts of energy charged into and discharged from the DC voltage source 8 and this makes it unnecessary to supply DC power from an external source and serves to provide a simplified system structure.

Incidentally, the voltage of the DC voltage source 8 may be controlled from an external source and, in this case, operation for controlling the output of the inverter circuit 100 need not involve control operation for maintaining the voltage Vsub at a constant level.

While the peak voltage of the voltage Vin is made higher than the DC voltage Vdc of the smoothing capacitor 11 in the foregoing embodiment, the former may be made lower than the latter. In this case, the power converting apparatus performs no operation in the aforementioned phase range $\theta 2 \leq \theta \leq \pi/2$ but performs operation for charging the DC voltage source 8 in a phase range $0 \leq \theta \leq \theta 1$ and operation for discharging the DC voltage source 8 in a phase range $\theta 1 \leq \theta \leq \pi/2$.

It is also possible to keep the short-circuiting switch 9 constantly in the OFF state with θ1 set to satisfy θ1=0 and, in this case, the power converting apparatus performs operation for discharging the DC voltage source 8 in a phase range 0≤θ≤θ2 and operation for charging the DC voltage source 8 in a phase range $\theta 2 \leq \theta \leq \pi/2$.

Also, while the foregoing embodiment has been described with reference to an arrangement in which the cathode of the rectifier diode 10 is connected to the positive electrode of the smoothing capacitor 11 in the output stage, the rectifier diode 10 may be arranged on a negative electrode side of the smoothing capacitor 11 so that the negative electrode thereof is connected to the anode of the rectifier diode 10, yet obtaining the same operation as in the foregoing embodiment.

Figure 7:
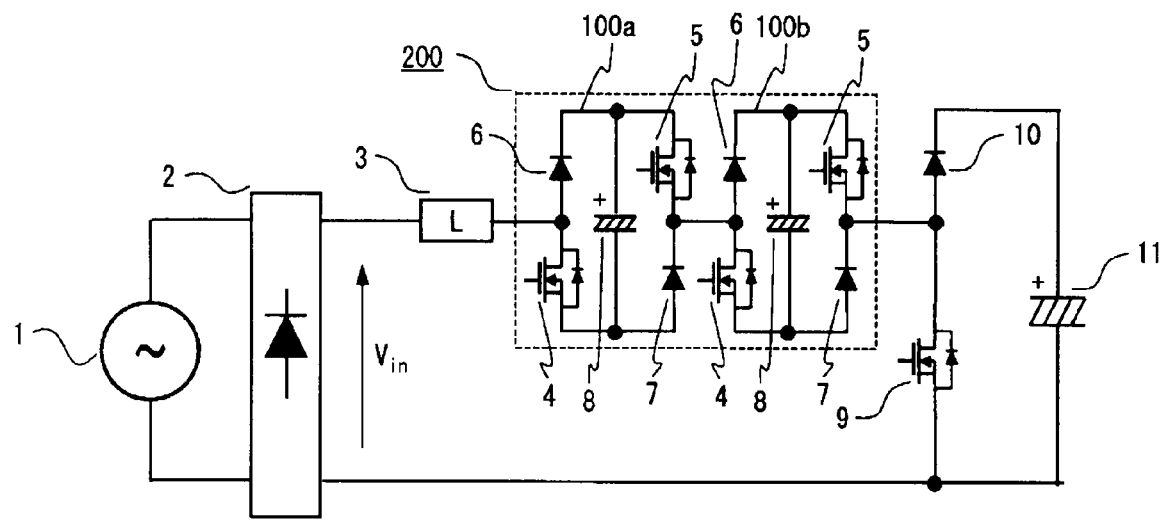
FIG. 7 is a configuration diagram of a power converting apparatus according to one variation of the first embodiment of this invention.

Also, while the foregoing embodiment has been described with reference to an arrangement in which the inverter circuit 100 is configured with one single-phase inverter, the power converting apparatus may be reconfigured to include an inverter circuit 200 in which AC sides of a plurality of single-phase inverters 100a, 100b are connected in series as depicted in FIG. 7. In this case, the sum of outputs of the individual single-phase inverters 100a, 100b produces an output of the inverter circuit 200 and the power converting apparatus is controlled such that the DC voltage of the smoothing capacitor 11 follows a target voltage and the input power factor of the AC power supply 1 is improved by using a current command as in the foregoing embodiment. Then, the inverter circuit 200 superimposes a voltage generated on the AC side on the voltage Vin at the downstream end of the diode bridge 2. In this case, the inverter circuit 200 may produce an output by gradational control operation in which a steplike voltage waveform is generated from the sum of the outputs of the plurality of single-phase inverters or by performing PWM control of a specified one of the plurality of single-phase inverters.

Second Embodiment

Figure 8:
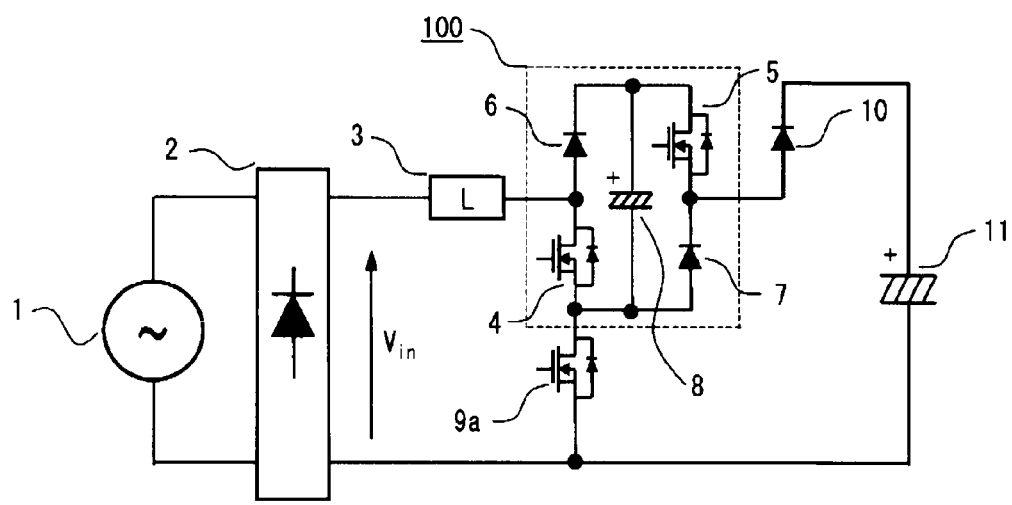
FIG. 8 is a configuration diagram of a power converting apparatus according to a second embodiment of this invention.

Although one end of the short-circuiting switch 9 is connected to the AC output line of the inverter circuit 100 in the above-described first embodiment, one end of a short-circuiting switch 9a is connected to a negative electrode side of the DC voltage source 8 which forms part of the inverter circuit 100 in this second embodiment as illustrated in FIG. 8. The other end of the short-circuiting switch 9a is connected to the negative electrode side of the smoothing capacitor 11, or one end of the diode bridge 2, in the same fashion as in the foregoing first embodiment.

Figure 9:
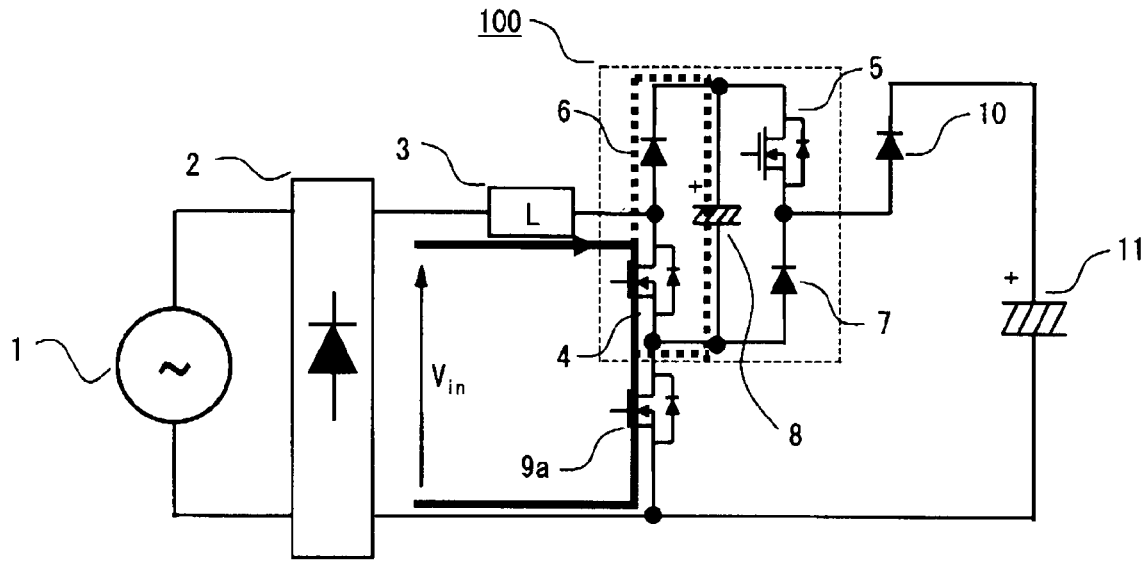
FIG. 9 is a diagram for explaining the working of the power converting apparatus according to the second embodiment of this invention.

The inverter circuit 100 and the short-circuiting switch 9a are controlled in the same way as in the foregoing first embodiment. When the short-circuiting switch 9a is in the ON state, or when the phase θ of the input voltage from the AC power supply 1 falls within any of the short-circuiting phase ranges 20 of the zero-crossing phases (θ=0, π) ±θ1, however, there is formed a current path as indicated in FIG. 9 in this embodiment. The current from the AC power supply 1 flows through the path routed along the AC power supply 1, the diode bridge 2, the reactor 3, the semiconductor switching device 4 of the inverter circuit 100, the short-circuiting switch 9a, the diode bridge 2 and the AC power supply 1 or along the AC power supply 1, the diode bridge 2, the reactor 3, the diode 6 of the inverter circuit 100, the DC voltage source 8, the short-circuiting switch 9a, the diode bridge 2 and the AC power supply 1. At this time, energy is charged into the DC voltage source 8 of the inverter circuit 100 until the short-circuiting switch 9a is turned off at a point where θ=θ1 as in the foregoing first embodiment. After the short-circuiting switch 9a has been turned off, there are formed current paths that are the same as those indicated in FIGS. 4 and 5 in the foregoing first embodiment.

The second embodiment discussed heretofore provides the same advantageous effects as obtained from the foregoing first embodiment. In addition, as the short-circuiting switch 9a is connected to the negative electrode side of the DC voltage source 8, it is possible to reduce the number of elements through which the current flows when the short-circuiting switch 9a is turned on, decrease conduction loss and improve conversion efficiency of the entirety of a power converting apparatus.

In a case where an inverter circuit 200 is configured with AC sides of a plurality of single-phase inverters 100a, 100b connected in series as depicted in FIG. 7, the power converting apparatus operates in the same way and produces the same effects if the short-circuiting switch 9a is connected to the negative electrode side of the DC voltage source 8 of the single-phase inverter 100b which is one of the plurality of single-phase inverters 100a, 100b connected at a downstream end thereof.

Third Embodiment

Next, a power converting apparatus according to a third embodiment of this invention is described with reference to FIG. 10.

Figure 10:
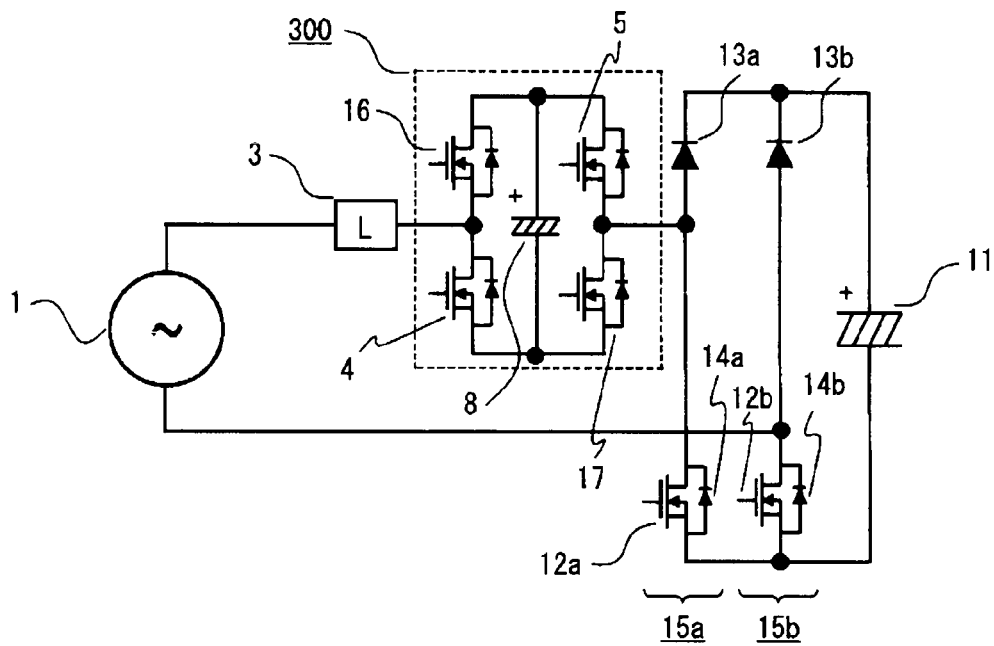
FIG. 10 a configuration diagram of a power converting apparatus according to a third embodiment of this invention.

As depicted in FIG. 10, an output from a first terminal of the AC power supply 1 is connected to the reactor 3 and an AC side of an inverter circuit 300 configured with a single-phase inverter is series-connected to a downstream end of the reactor 3. The single-phase inverter provided in the inverter circuit 300 includes semiconductor switching devices 4, 5, 16, 17 each of which is made up of an IGBT in which diodes are connected in reverse parallel or a MOSFET incorporating a diode connected between a source and a drain as well as a DC voltage source 8.

Also, a halfway point of a first series circuit 15a which constitutes an inverter in which a short-circuiting switch 12a made up of a semiconductor switching device and a rectifier diode 13a are connected in series is connected to an AC output line at a downstream end of the inverter circuit 300. Further, a halfway point of a second series circuit 15b which constitutes an inverter in which a short-circuiting switch 12b made up of a semiconductor switching device and a rectifier diode 13b are connected in series is connected to a second terminal of the AC power supply 1. The first and second series circuits 15a, 15b are connected parallel to each other between both terminals of the smoothing capacitor 11 provided in the output stage.

In this case, the individual short-circuiting switches 12a, 12b are not limited to the semiconductor switching devices but may be mechanically acting switches. Diodes 14a and 14b should however be connected in reverse parallel with the short-circuiting switches 12a and 12b, respectively.

In the working of the power converting apparatus thus configured, the inverter circuit 300 produces an output by controlling the current Iin by PWM control so that the DC voltage Vdc of the smoothing capacitor 11 is maintained at the specific target voltage Vdc* and the input power factor of the AC power supply 1 becomes approximately 1, and superimposes a voltage generated on the AC side on the voltage Vin input from the AC power supply 1 in the same fashion as in the foregoing first embodiment. The power converting apparatus switches the short-circuiting switches 12a, 12b at specified phases which are defined as zero-crossing phases (θ=0, π) of the phase θ of the input voltage from the AC power supply 1 ±θ1. Specifically, the power converting apparatus sets the short-circuiting switches 12a, 12b in the ON state to bypass the smoothing capacitor 11 only in each short-circuiting phase range 20 of ±θ1 of which midpoint matches each of the zero-crossing phases.

Figure 11:
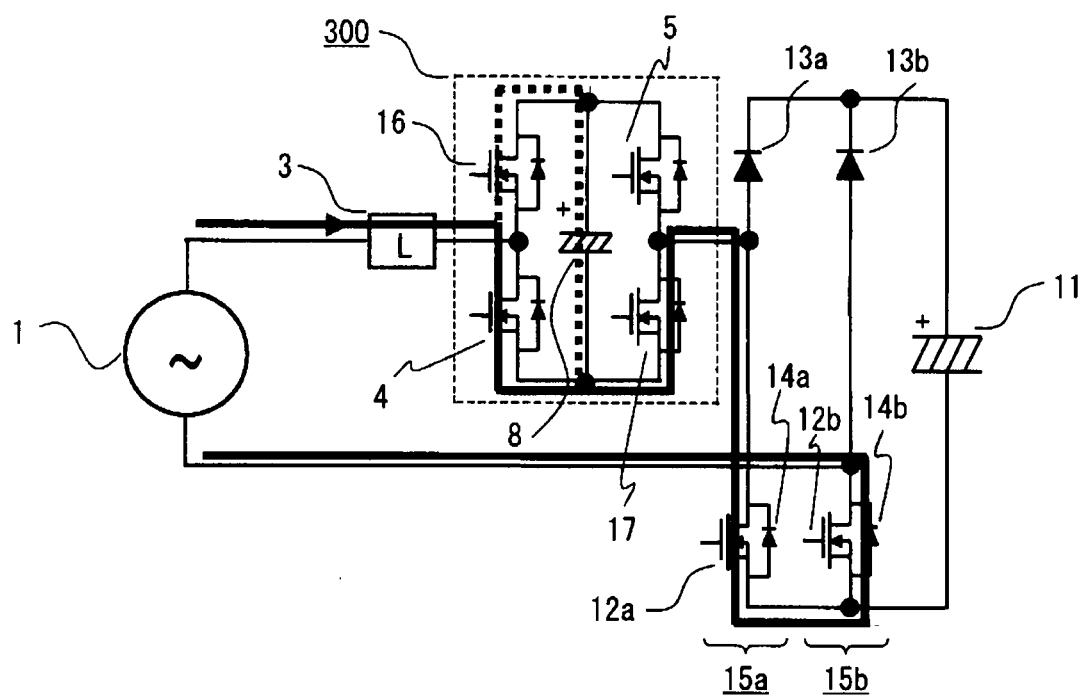
FIG. 11 is a diagram for explaining the working of the power converting apparatus according to the third embodiment of this invention.

If the short-circuiting switches 12a, 12b are set to the ON state when the polarity of the AC power supply 1 is positive and the phase θ of the voltage Vin falls within a range 0≤θ≤θ1 in the short-circuiting phase range 20, for example, a current flows through a path routed along the AC power supply 1, the reactor 3, the inverter circuit 300, the short-circuiting switch 12a, the short-circuiting switch 12b and the AC power supply 1 in this order as depicted in FIG. 11. If the short-circuiting switches 12a, 12b are set to the ON state when the polarity of the AC power supply 1 is negative and the phase θ of the voltage Vin falls within a range π≤θ≤π+θ1, for example, a current flows through a path routed along the AC power supply 1, the short-circuiting switch 12b, the short-circuiting switch 12a, the inverter circuit 300, the reactor 3 and the AC power supply 1 in a direction reversed with respect to the path depicted in FIG. 11. At this time, the inverter circuit 300 produces the output by controlling the current Iin by PWM control so that the input power factor becomes approximately 1 while generating a voltage that is approximately equal to a reversal of the voltage Vin. Energy is charged into the DC voltage source 8 of the inverter circuit 300 during this period.

While the short-circuiting switches 12a, 12b are set to the ON state at the same time within the short-circuiting phase range 20 as discussed above, this approach may be so modified as to set only the short-circuiting switch 12a to the ON state when the polarity of the AC power supply 1 is positive and set only the short-circuiting switch 12b to the ON state when the polarity of the AC power supply 1 is negative. In the latter case, a current flows through one of the diodes 14a, 14b connected to the other one of the short-circuiting switches 12a, 12b.

Figure 12:
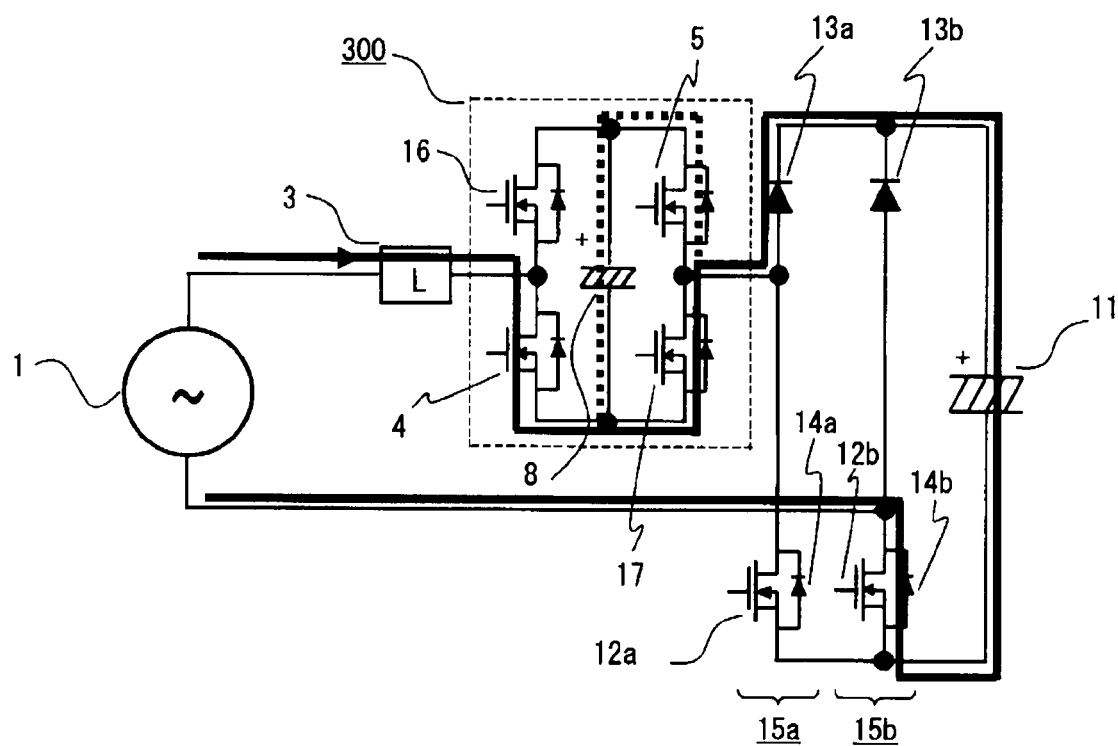
FIG. 12 is a diagram for explaining the working of the power converting apparatus according to the third embodiment of this invention.

If the short-circuiting switches 12a, 12b are turned off when the phase θ of the voltage Vin falls within a range of any of the zero-crossing phases (θ=0, π) ±θ1, a current flows in a below-described manner. When the polarity of the AC power supply 1 is positive, the current flows through a path routed along the AC power supply 1, the reactor 3, the inverter circuit 300, the rectifier diode 13a, the smoothing capacitor 11, the diode 14b of the short-circuiting switch 12b and the AC power supply 1 in this order as depicted in FIG. 12. When the polarity of the AC power supply 1 is negative, the current flows through a path routed along the AC power supply 1, the rectifier diode 13b, the smoothing capacitor 11, the diode 14a of the short-circuiting switch 12a, the inverter circuit 300, the reactor 3 and the AC power supply 1 in this order. At this time, the inverter circuit 300 maintains the DC voltage Vdc of the smoothing capacitor 11 at the target voltage Vdc* and produces the output by controlling the current Iin so that the input power factor becomes approximately 1. In this case, the DC voltage source 8 is discharged if the absolute value of the voltage Vin is equal to or lower than the target voltage Vdc* of the smoothing capacitor 11 whereas the DC voltage source 8 is charged if the absolute value of the voltage Vin is equal to or higher than the target voltage Vdc*.

The target voltage Vdc* of the smoothing capacitor 11 is determined by θ1 which defines the short-circuiting phase range 20 and, thus, the target voltage Vdc* can be controlled by varying θ1 in the present embodiment in the same fashion as in the foregoing first embodiment. Then, the DC voltage Vdc of the smoothing capacitor 11 is controlled to follow the target voltage Vdc*.

If the voltage Vsub of the DC voltage source 8 is set at a level equal to or lower than the peak voltage Vp of Vin to satisfy three conditions expressed by Vp·sin θ1≤Vsub, (Vdc*−Vp·sin θ1)≤Vsub and (Vp−Vdc*)≤Vsub, it is possible to maintain the DC voltage Vdc of the smoothing capacitor 11 at the target voltage Vdc* and causes the inverter circuit 300 to reliably perform the control operation for controlling the current Iin in such a manner that the input power factor becomes approximately 1 at all phases of the AC power supply 1.

The inverter circuit 300 generates a current command in the same fashion as in the foregoing first embodiment and is controlled by a voltage command calculated on the basis of the current command. Here, the inverter circuit 300 is controlled to switch between operations for charging and discharging the DC voltage source 8 with the voltage command corrected by adding thereto a feedforward correction voltage ΔV which is synchronized with timings of turning on and off the short-circuiting switches 12a, 12b in the same fashion as in the foregoing first embodiment. This arrangement makes it possible to avoid a delay in control operation by as much as a feedback control response time and thereby achieve high-speed control.

In the present third embodiment, the input power factor is improved and the DC voltage Vdc in the output stage is controlled by the control operation of the inverter circuit 300 as in the foregoing first embodiment, so that the inverter circuit 300 can decrease a voltage handled in switching operation to a level significantly lower than the peak voltage of the AC power supply 1, making it possible to reduce switching loss and noise without the need for a reactor 3 having a large capacity. Also, with the provision of the short-circuiting switches 12a, 12b, the DC voltage source 8 of the inverter circuit 300 can be charged while bypassing the smoothing capacitor 11 when the short-circuiting switches 12a, 12b are in the ON state. Therefore, it is possible to further decrease the voltage handled in the switching operation, achieve a higher efficiency and a further reduction in noise, and thus obtain the same advantageous effects as in the foregoing first embodiment.

Furthermore, since the diode bridge 2 employed in the foregoing first embodiment is made unnecessary, it is possible to reduce the number of components and provide a simplified system structure. Also, as the number of elements through which the current flows can be reduced, it is possible to decrease conduction loss and improve conversion efficiency of the entirety of the power converting apparatus.

Incidentally, the inverter circuit 300 may be reconfigured such that AC sides of a plurality of single-phase inverters are connected in series as depicted in FIG. 7 in this third embodiment as well.

Also, while one or more of the rectifier diodes 10, 13a, 13b are connected to the smoothing capacitor 11 in the foregoing individual embodiments, semiconductor switching devices may be connected instead of these rectifier diodes 10, 13a, 13b to perform the same operation by ON/OFF control thereof.

The invention claimed is:

1. A power converting apparatus comprising:
a rectification circuit for rectifying an input from an AC input power supply having only single phase;
an inverter circuit in which AC sides of at least one single-phase inverter are connected in series and connected to an output of said rectification circuit in series, each single-phase inverter having a plurality of semiconductor switching devices and a DC voltage source, said inverter circuit being configured to superimpose a sum of an output of each single-phase inverter on the output of said rectification circuit;
a smoothing capacitor connected to a downstream end of said inverter circuit via a rectifier diode for smoothing an output of said inverter circuit; and
a short-circuiting switch of which one end is connected to said inverter circuit and another end is connected to one end of said smoothing capacitor; wherein
said short-circuiting switch is set to an ON state to bypass said smoothing capacitor only during time ranges having midpoints that coincide with each of zero-crossing points of a single-phase input voltage from said AC input power supply; and
the output of said inverter circuit is controlled by pulse width modulation using a current command generated by determining a first difference between a DC voltage of the smoothing capacitor and a first target voltage, determining a second difference between a voltage of the DC voltage source and a second target voltage, determining first and second outputs by applying feedback control to a first and second differences respectively, and summing the first and second outputs.

2. The power converting apparatus according to claim 1, wherein one end of said short-circuiting switch is connected to an AC output line of said inverter circuit at the downstream end thereof.

3. The power converting apparatus according to claim 1, wherein one end of said short-circuiting switch is connected to one end of the DC voltage source of one of said at least one single-phase inverter constituting said inverter circuit connected at a downstream end thereof.

4. The power converting apparatus according to claim 1, wherein the target voltage of said smoothing capacitor is adjusted by varying a duration of the time ranges in which said short-circuiting switch is set to an ON state.

5. The power converting apparatus according to claim 1, wherein said inverter circuit is controlled to switch between operations for charging and discharging DC power at timings of turning on and off said short-circuiting switch.

6. The power converting apparatus according to claim 1, wherein a current-limiting circuit is connected to an AC side of said inverter circuit in series therewith.

7. The power converting apparatus according to claim 1, wherein the output of said inverter circuit is controlled by varying the current command so that a DC voltage of said inverter circuit becomes equal to a specific value.

8. The power converting apparatus according to claim 1, wherein a DC voltage of said inverter circuit is set to become equal to or lower than a peak voltage value of said AC input power supply.

9. The power converting apparatus according to claim 1, wherein current flows through the smoothing capacitor only during times outside the time ranges having midpoints that coincide with each of zero-crossing points of the single-phase input voltage from the AC input power supply.

10. A power converting apparatus comprising:
an inverter circuit in which AC sides of at least one single-phase inverter are connected in series and connected to a first terminal of an AC input power supply having only a single phase in series, each single-phase inverter having a plurality of semiconductor switching devices and a DC voltage source, said inverter circuit being configured to superimpose the sum of an output of each single-phase inverter on an AC input;
a smoothing capacitor disposed in a downstream stage of said inverter circuit for smoothing an output of said inverter circuit; and
first and second series circuits each of which is configured with a short-circuiting switch and a rectifier diode which are connected in series between both terminals of said smoothing capacitor; wherein
a halfway point of said first series circuit is connected to an AC output line of said inverter circuit at a downstream end thereof whereas a halfway point of said second series circuit is connected to a second terminal of said single-phase AC input power supply,
said short-circuiting switches are set to an ON state to bypass said smoothing capacitor only during time ranges having midpoints that coincide with each of zero-crossing points of a single-phase input voltage from said AC input power supply, and
the output of said inverter circuit is controlled by pulse width modulation using a current command generated by determining a first difference between a DC voltage of the smoothing capacitor and a first target voltage, determining a second difference between a voltage of the DC voltage source and a second target voltage, determining first and second outputs by applying feedback control to the first and second difference respectively, and summing the first and second outputs.

11. The power converting apparatus according to claim 10, wherein a diode is connected in reverse parallel with each of said short-circuiting switches.

12. The power converting apparatus according to claim 10, wherein the target voltage of said smoothing capacitor is adjusted by varying a duration of the time ranges in which said short-circuiting switches are set to an ON state.

13. The power converting apparatus according to claim 10, wherein said inverter circuit is controlled to switch between operations for charging and discharging DC power at timings of turning on and off said short-circuiting switches.

14. The power converting apparatus according to claim 10, wherein a current-limiting circuit is connected to an AC side of said inverter circuit in series therewith.

15. The power converting apparatus according to claim 10, wherein the output of said inverter circuit is controlled by varying the current command so that a DC voltage of said inverter circuit becomes equal to a specific value.

16. The power converting apparatus according to claim 10, wherein a DC voltage of said inverter circuit is set to become equal to or lower than a peak voltage value of said AC input power supply.

17. The power converting apparatus according to claim 10 wherein current flows through the smoothing capacitor only during times outside the time ranges having mid points that coincide with each of zero-crossing points of the single-phase input voltage from the AC input power supply.

* * * * *